(12) United States Patent
Santos et al.

(10) Patent No.: US 7,999,536 B2
(45) Date of Patent: Aug. 16, 2011

(54) ABSOLUTE POSITION MAGNETIC ENCODER WITH BINARY AND DECIMAL OUTPUT

(75) Inventors: Alfred John Santos, Keene, NH (US); Bruce M. Pride, Westmoreland, NH (US)

(73) Assignee: The Timken Company, Canton, OH (US)

( * ) Notice: Subject to any disclaimer, the term of this patent is extended or adjusted under 35 U.S.C. 154(b) by 448 days.

(21) Appl. No.: 12/252,083

(22) Filed: Oct. 15, 2008

(65) Prior Publication Data
US 2009/0102461 A1 Apr. 23, 2009

Related U.S. Application Data

(60) Provisional application No. 60/981,600, filed on Oct. 22, 2007.

(51) Int. Cl.
*G01B 7/14* (2006.01)
(52) U.S. Cl. ................. 324/207.2; 324/207.13
(58) Field of Classification Search .............. None
See application file for complete search history.

(56) References Cited

U.S. PATENT DOCUMENTS

| | | | | |
|---|---|---|---|---|
| 4,507,590 A | * | 3/1985 | Miyazaki | 318/400.4 |
| 4,947,166 A | | 8/1990 | Wingate et al. | |
| 5,019,776 A | * | 5/1991 | Kawamata et al. | 324/207.12 |
| 5,117,183 A | * | 5/1992 | Santos | 324/228 |
| 5,307,013 A | * | 4/1994 | Santos et al. | 324/207.2 |
| 5,322,028 A | * | 6/1994 | Hashiride et al. | 112/278 |
| 5,325,056 A | * | 6/1994 | Shonowaki et al. | 324/207.21 |
| 5,568,048 A | | 10/1996 | Schroeder et al. | |
| 5,898,301 A | | 4/1999 | La Croix et al. | |
| 6,486,658 B2 | * | 11/2002 | Naidu | 324/207.21 |
| 6,515,471 B1 | | 2/2003 | Santos | |
| 2008/0114523 A1 | * | 5/2008 | Dugas et al. | 701/101 |

FOREIGN PATENT DOCUMENTS

| | | |
|---|---|---|
| EP | 0469318 | 2/1992 |
| EP | 0539602 | 5/1993 |
| EP | 0611952 | 8/1994 |
| FR | 2479453 | 10/1981 |
| GB | 2096421 | 10/1982 |
| JP | 59212712 | 12/1984 |
| JP | 67056 | 1/1994 |
| WO | 2007121192 | 10/2007 |

OTHER PUBLICATIONS

The International Search Report and Written Opinion for PCT/US2008/080000 dated May 8, 2009.

* cited by examiner

*Primary Examiner* — Paresh Patel
(74) *Attorney, Agent, or Firm* — Michael Best & Friedrich LLP

(57) ABSTRACT

An absolute position magnetic encoder includes a first magnetic track configured for a binary output, a second magnetic track configured for a decimal output, a first magnetic sensor positioned proximate the first magnetic track to detect the magnetic field of the first magnetic track, and a second magnetic sensor positioned proximate the second magnetic track to detect the magnetic field of the second magnetic track. The encoder is selectively operable to provide one of the binary output and the decimal output.

42 Claims, 4 Drawing Sheets

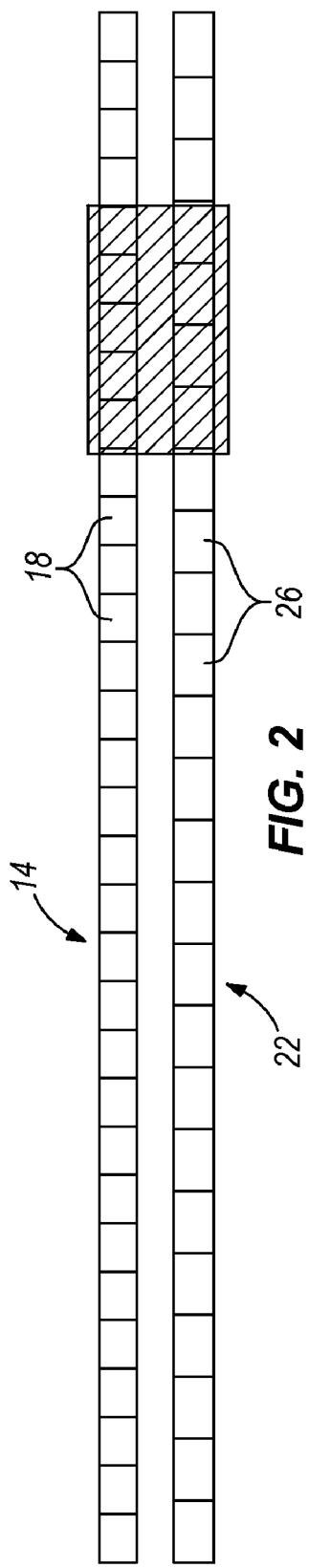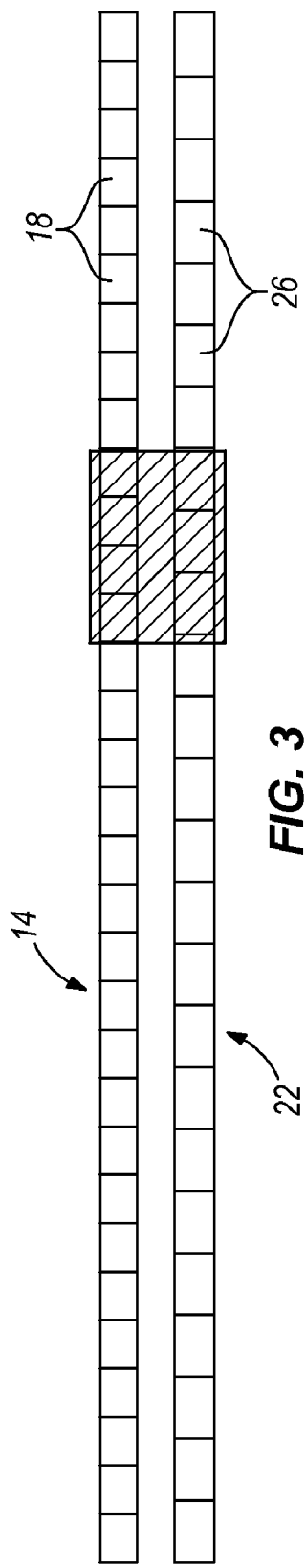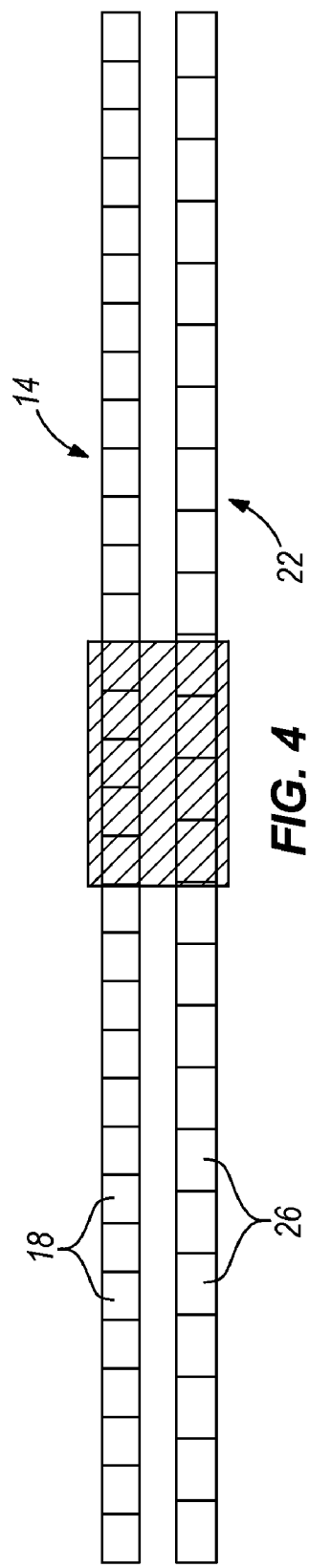

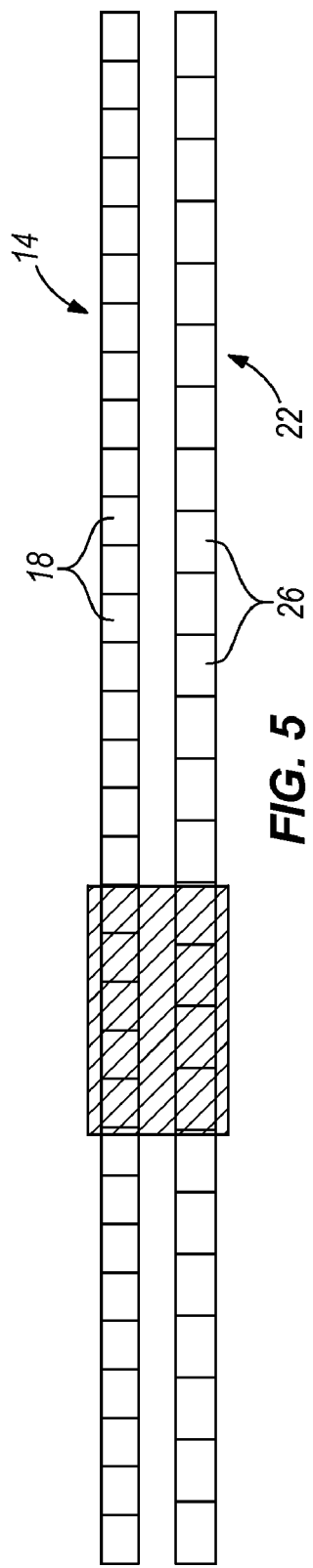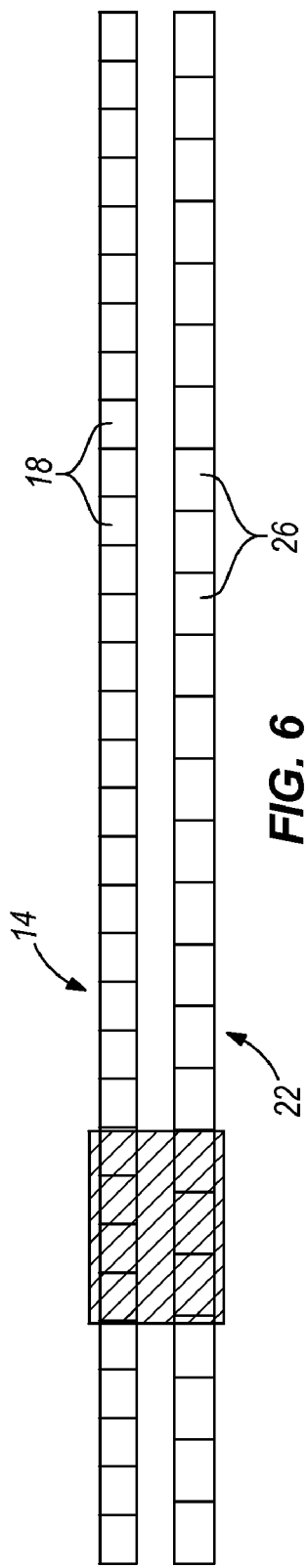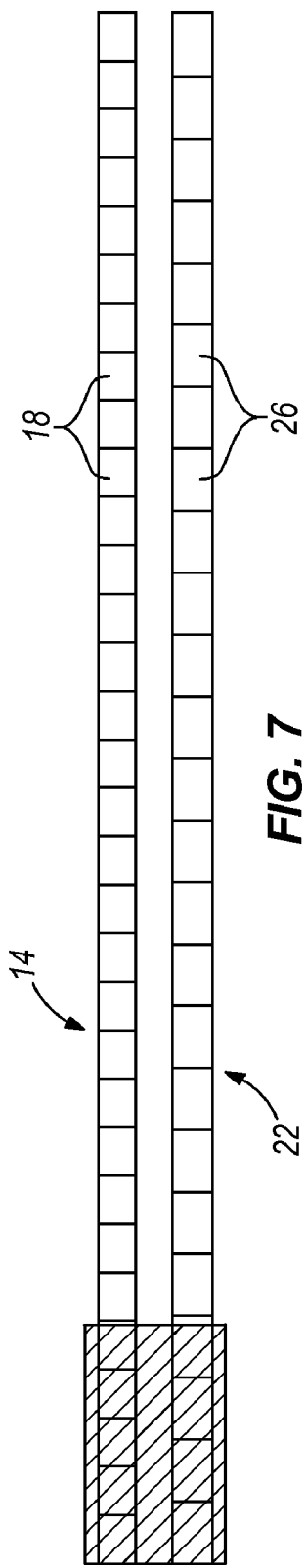

ABSOLUTE POSITION MAGNETIC ENCODER WITH BINARY AND DECIMAL OUTPUT

RELATED APPLICATIONS

This application claims priority to U.S. Provisional Patent Application Ser. No. 60/981,600 filed on Oct. 22, 2007, the entire content of which is incorporated herein by reference.

FIELD OF THE INVENTION

The present invention relates generally to the use of magnetic sensors for determining the absolute position of a target having magnetic poles.

BACKGROUND OF THE INVENTION

Magnetic encoders are typically utilized to determine a position of a moving object in a mechanical system so the position or movement of the object can be controlled in the mechanical system. Magnetic encoders typically include a target, including dual multi-pole magnetic tracks, mounted on the moving object and magnetic sensors (e.g., strings of Hall-effect devices) placed in proximity to the poles of the respective magnetic tracks. The pole spacing of the respective magnetic tracks is typically different to induce a phase difference in the signals detected by the magnetic sensors over the respective tracks. The phase difference between the respective signals of the magnetic sensors is then utilized to determine the position of the target, and therefore the movable object, at any given time. In other words, the position of one of the magnetic tracks (i.e., the "measured track") can be determined by comparing the signal output by the magnetic sensor over the measured track and the signal output by the magnetic sensor over the other track (i.e., the "reference track").

Depending upon the control system with which a magnetic encoder is utilized, a decimal output or a binary output by the encoder may be desired. In such cases where a decimal output is desired, a magnetic encoder can be configured with a measured track having a particular number of North/South pole pairs (hereinafter "pole pairs") and magnetic sensors having a particular resolution (i.e., "counts" or "edges" per pole pair) to yield a total number of counts or edges per revolution of a measured track that is divisible by 10, 100, and so on to yield a whole number of counts per revolution. For example, a resolution of 1000 counts per revolution of the measured track is often desired when a magnetic encoder is configured for decimal output. Such a resolution can be achieved by providing a target having a 25 pole-pair measured track, a 24 pole-pair reference track, and magnetic sensors having a resolution of 160 counts per pole pair (i.e., 25 pole pairs×160 counts/pole pair=4000 total counts per revolution of the measured track; then dividing by 4 to achieve the desired resolution of 1000 counts per revolution of the measured track).

In such cases where a binary output is desired, a magnetic encoder can be configured with a measured track having a particular number of pole pairs and magnetic sensors having a particular resolution to yield a total number of counts or edges per revolution of a measured track that is a factor of 2 to yield a binary number of counts per revolution. For example, a resolution of 1024 counts per revolution of the measured track is often desired when a magnetic encoder is configured for binary output. Such a resolution can be achieved by providing a target having a 32 pole-pair measured track, a 31 pole-pair reference track, and magnetic sensors having a resolution of 128 counts per pole pair (i.e., 32 pole pairs×128 counts/pole pair=4096 total counts per revolution of the measured track; then dividing by 4 to achieve the desired resolution of 1024 counts per revolution of the measured track).

SUMMARY OF THE INVENTION

However, to reconfigure a conventional magnetic encoder from decimal output to binary output, the target must be changed to substitute the measured track having a particular number of pole pairs conducive for decimal output (e.g., 25 pole pairs) for a measured track having a particular number of pole pairs conducive for binary output (32 pole pairs). The magnetic sensors must also be reconfigured or replaced to provide a resolution conducive to decimal output or binary output.

The present invention provides, in one aspect, an absolute position magnetic encoder capable of decimal output and binary output, without changing or replacing the target or either of the measured track or the reference track. The absolute position magnetic encoder includes a first magnetic track configured for binary output, a second magnetic track configured for decimal output, and respective magnetic sensors positioned proximate the first and second magnetic tracks to detect the magnetic fields of the first and second magnetic tracks. The absolute position magnetic encoder also includes a third magnetic track comprised of a single North/South pole pair, and a plurality of Hall-effect devices positioned proximate the third magnetic track to detect the magnetic field of the third magnetic track. The encoder is selectively operable to provide one of the binary output and the decimal output.

The present invention provides, in another aspect, a method of calculating an absolute position of an encoder including providing a first magnetic track configured for a binary output, providing a second magnetic track configured for a decimal output, detecting a first count value from the first magnetic track, detecting a second count value from the second magnetic track substantially simultaneously with the first count value, and calculating a third count value indicative of the absolute position of the encoder using the first and second count values. The third count value is conducive to provide one of the binary output and the decimal output.

Other features and aspects of the invention will become apparent by consideration of the following detailed description and accompanying drawings.

BRIEF DESCRIPTION OF THE DRAWINGS

FIG. 2 is a schematic of the absolute position magnetic encoder of FIG. 1, illustrating a second phase shift interval between the first and second magnetic tracks.

FIG. 3 is a schematic of the absolute position magnetic encoder of FIG. 1, illustrating a third phase shift interval between the first and second magnetic tracks.

FIG. 4 is a schematic of the absolute position magnetic encoder of FIG. 1, illustrating a fourth phase shift interval between the first and second magnetic tracks.

FIG. 5 is a schematic of the absolute position magnetic encoder of FIG. 1, illustrating a fifth phase shift interval between the first and second magnetic tracks.

FIG. 6 is a schematic of the absolute position magnetic encoder of FIG. 1, illustrating a sixth phase shift interval between the first and second magnetic tracks.

FIG. 7 is a schematic of the absolute position magnetic encoder of FIG. 1, illustrating a seventh phase shift interval between the first and second magnetic tracks.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
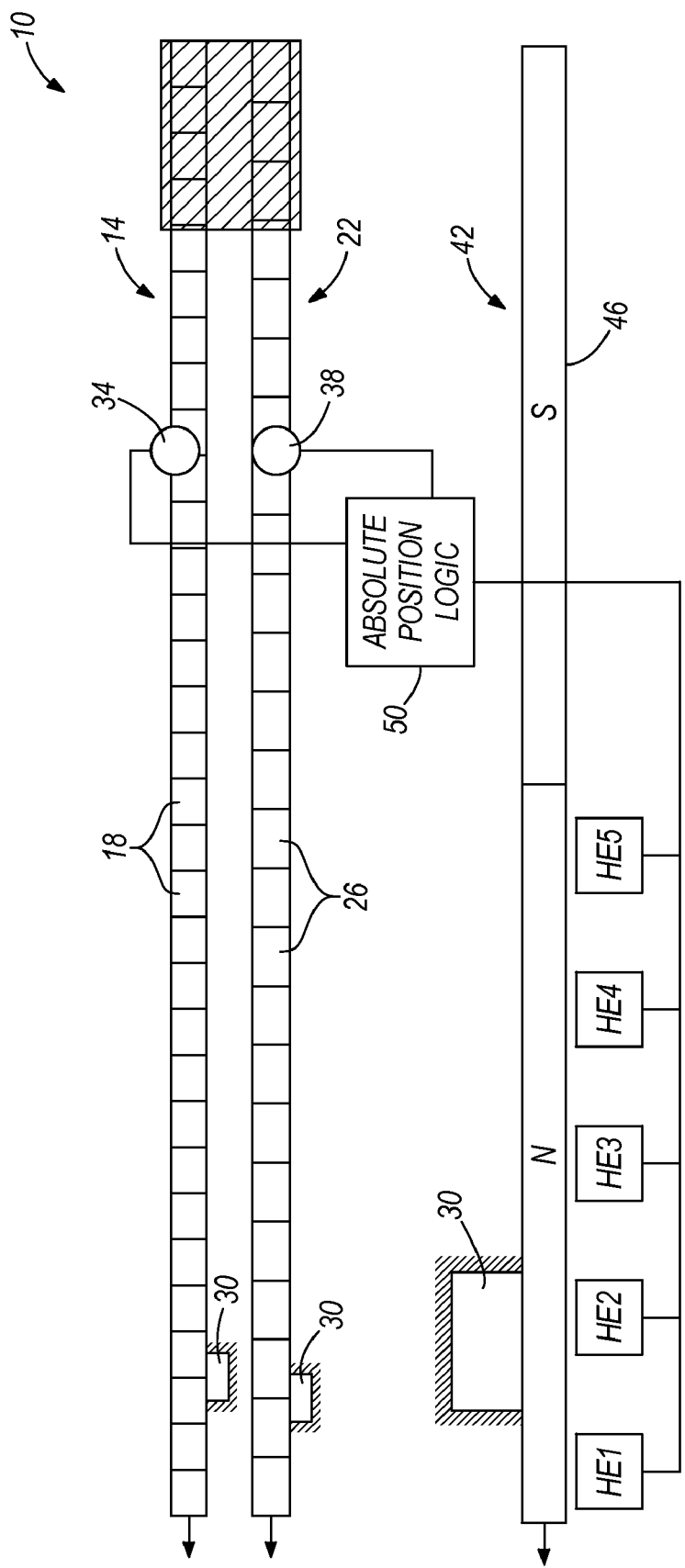
FIG. 1 is a schematic of an absolute position magnetic encoder of the present invention, illustrating a first magnetic track, a second magnetic track, respective magnetic sensors proximate the first and second magnetic tracks, a third magnetic track, and a plurality of Hall-effect devices proximate the third magnetic track, in which a first phase interval between the first and second magnetic tracks is shown.

With reference to FIG. 1, an absolute position magnetic encoder 10 is schematically illustrated. The encoder 10 includes a first magnetic track 14 having a plurality of North/South pole pairs 18 (each box represents a single North/South pole pair 18), and a second magnetic track 22 having a plurality of North/South pole pairs 26 (each box represents a single North/South pole pair 26) positioned proximate the first magnetic track 14. Although the respective tracks 14, 22 are schematically illustrated in a linear configuration for clarity, the encoder 10 is configured as a rotary encoder 10 including a target wheel 30 upon which the tracks 14, 22 are mounted, such that the ends of the respective tracks 14, 22 are connected to form two concentric, circular tracks, with the track 22 being positioned within or inside the track 14 (see FIG. 8). As a result, the respective lengths of the tracks 14, 22 differ due to the different radial positions of the tracks 14, 22 on the target wheel 30. However, the encoder 10 of the present invention may also be configured as a linear encoder, incorporating substantially similar structure and a method of operation as described herein with respect to the rotary encoder 10.

With reference to FIG. 1, the track 14, when configured in the circular arrangement discussed above, includes a number of pole pairs 18 that is conducive to provide a binary or a base-2 output (see Table 1 below), while the track 22, when arranged concentrically with the track 14, includes a number of pole pairs 26 that is conducive to provide a decimal or a base-10 output. In the illustrated construction of the encoder 10, the track 14 includes 32 pole pairs 18, and the track 22 includes 25 pole pairs 26. Alternatively, other constructions of the encoder 10 may incorporate a track 14 including 64 pole pairs, and a track 22 including 50 pole pairs.

TABLE 1

| | Decimal Equivalent | Binary Equivalent |
| --- | --- | --- |
| $2^3$ | 8 | 1000 |
| $2^4$ | 16 | 10000 |
| $2^5$ | 32 | 100000 |
| $2^6$ | 64 | 1000000 |
| $2^7$ | 128 | 10000000 |
| $2^8$ | 256 | 100000000 |
| $2^9$ | 512 | 1000000000 |
| $2^{10}$ | 1024 | 10000000000 |

The absolute position magnetic encoder 10 also includes a magnetic sensor 34 proximate the track 14, and another magnetic sensor 38 proximate the track 22. In the illustrated construction, each of the sensors 34, 38 is configured as a microchip having a Hall string multiplying sensor. Such sensors 34, 38 are available from The Timken Company of Canton, Ohio as part number MPS160. As understood by those skilled in the art, the sensor 34 can be configured with a particular resolution (i.e., "counts" or "edges" per pole pair 18) to yield a total number of counts or edges per revolution of the track 14 that is conducive to provide a binary output, or that is suited to be converted into a simple binary number (i.e., a whole number power of "2"). In the illustrated construction, a resolution of 1024 counts per revolution of the track 14 (the decimal equivalent of the binary number "10000000000") can be achieved by providing the track 14 with 32 pole-pairs 18 and configuring the magnetic sensor 34 with a resolution of 128 counts per pole pair (i.e., 32 pole pairs×128 counts/pole pair=4096 total counts per revolution of the track 14). The desired resolution of 1024 counts per revolution of the track 14 can be achieved by dividing the total counts per revolution of the track 14 by 4.

Likewise, it should be understood by those skilled in the art that the sensor 38 can be configured with a particular resolution (i.e., counts or edges per pole pair 26) to yield a total number of counts or edges per revolution of the track 22 that is a whole number power of "10." In the illustrated construction, a resolution of 1000 counts per revolution of the track 22 (i.e., $10^3$) can be achieved by providing the track 22 with 25 pole pairs 26 and configuring the magnetic sensor 38 with a resolution of 160 counts per pole pair (i.e., 25 pole pairs×160 counts/pole pair=4000 total counts per revolution of the track 22). The desired resolution of 1000 counts per revolution of the track 22 can be achieved by dividing the total counts per revolution of the track 22 by 4. Though the sensors 34, 38 may be structurally similar, a dip switch may be mounted on each of the sensors 34, 38 to allow the sensor 38 to be toggled to a resolution conducive to decimal output (1000 counts per revolution) and to allow the sensor 34 to be toggled to a resolution conducive to binary output (1024 counts per revolution). Alternatively, each of the sensors 34, 38 may be programmed for a decimal or binary output using internal switches in the form of fuses or memory elements.

With continued reference to FIG. 1, the absolute position magnetic encoder 10 further includes a third magnetic track 42 concentric with the tracks 14, 22, and disposed inside the track 22 when the respective tracks 14, 22 are circularly arranged as discussed above. The track 42 includes a single pole pair 46, such that about 180 degrees of the track 42 is comprised of a North pole, and about 180 degrees of the track 42 is comprised of a South pole. The absolute position magnetic encoder 10 also includes a plurality of Hall-effect devices HE1-HE5 (e.g., Hall-effect sensors) proximate the track 42 to detect the magnetic field emanated by the track 42. In the illustrated construction, five Hall-effect devices HE1-HE5 are utilized. Alternatively, a different number of Hall-effect devices may be employed, depending upon the number of pole pairs 18, 26 in each of the tracks 14, 22. Further, rotary magnetic position sensors, such as the AS5040 sensor manufactured by Austriamicrosystems AG of Unterpremstaetten, Austria may be substituted for the Hall-effect devices HE1-HE5. Magnetoresistive sensors (i.e., MR sensors), or any other magnetic field sensors, may alternatively be used in place of the Hall-effect devices HE1-HE5. As shown in FIG. 1, the Hall-effect devices HE1-HE5 are spaced from each other such that all of the devices HE1-HE5 may fit within the circumferential length of one of the poles of the track 42.

With continued reference to FIG. 1, the absolute position magnetic encoder 10 also includes a logic module 50 in communication with the sensors 34, 38 and the Hall-effect devices HE1-HE5. Although physical (i.e., wired) connections are schematically illustrated in FIG. 1, wireless communication may be employed to allow the sensors 34, 38 and the Hall-effect devices HE1-HE5 to communicate with the logic module 50.

During operation of the encoder 10, the sensor 34 is configured to detect the magnetic field emanated by the track 14, and the sensor 38 is configured to detect the magnetic field emanated by the track 22. Because the track 22 includes fewer pole pairs 26 than the track 14, the sensor 34 outputs a signal that is out of phase with the signal output by the sensor 38. Specifically, in the illustrated construction, the difference of seven pole pairs between the tracks 14, 22 yields seven intervals along the tracks 14, 22 during which the respective signals output by the sensors 34, 38 are out of phase (see FIGS. 1-7 illustrating the seven phase shift intervals). Although the signals do not appear to exactly come back into phase toward the end of each phase shift interval (due to the slightly offset pole junctions toward the end of each interval), wrapping the tracks 14, 22 in a circular arrangement as discussed above would allow more clearly defined phase shift intervals and alignment of pole junctions toward the end of each interval. In addition, the sensors 34, 38 may include signal conditioning electronics to condition the respective signals to provide more clearly defined, discrete phase shift intervals than those schematically illustrated in FIGS. 1-7.

When prompted by a controller or other device (not shown), the sensor 34 detects a value that corresponds to the count of whichever pole pair 18 the sensor 34 is over. Likewise, the sensor 38 substantially simultaneously detects a value that corresponds to the count of whichever pole pair 26 the sensor 38 is over. Both "counts" are then output to the logic module 50. A more detailed discussion of this process appears below.

Figure 8:
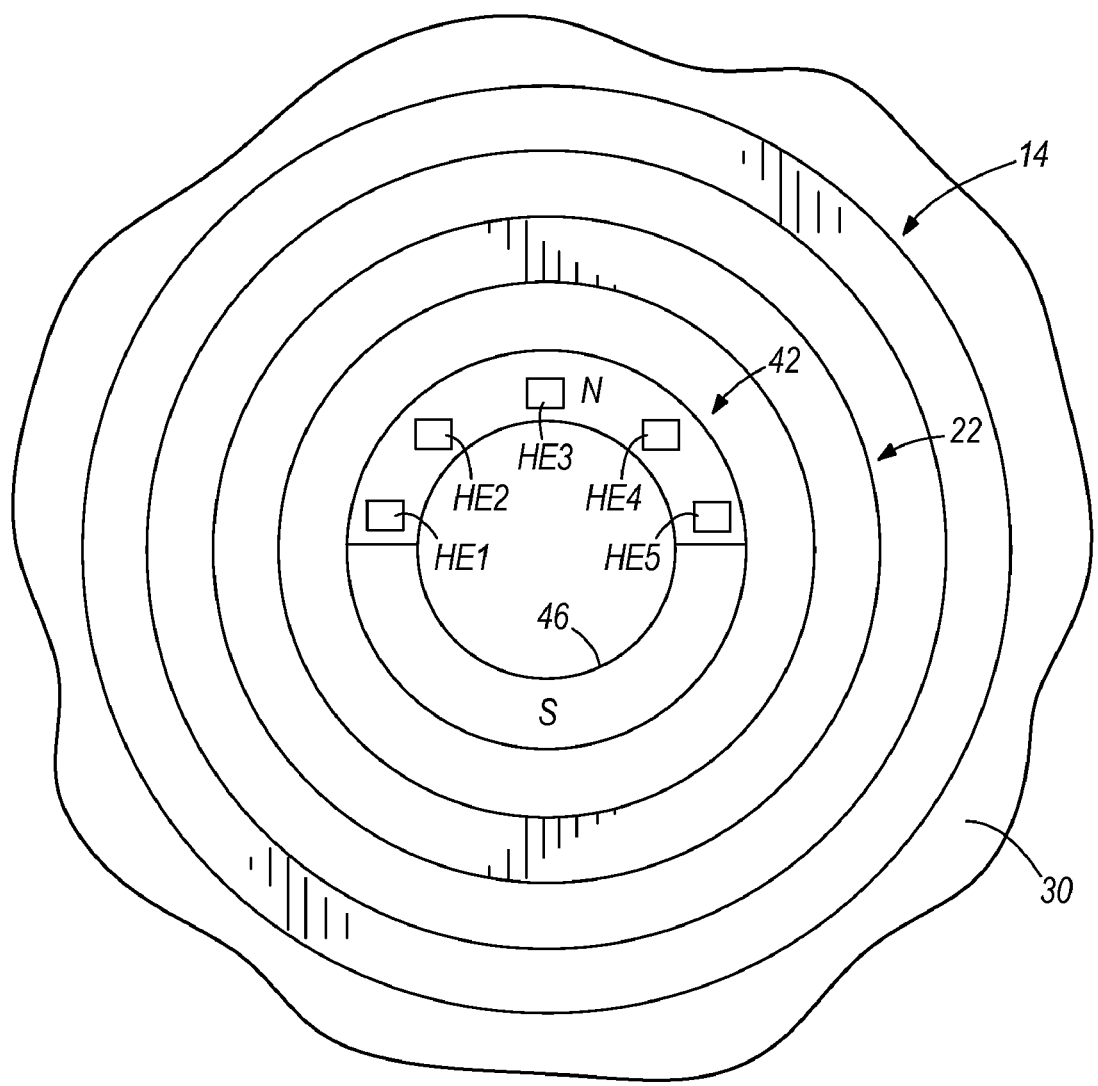
FIG. 8 is a schematic of the absolute position magnetic encoder of FIG. 1, illustrating the first, second, and third magnetic tracks in a circular arrangement, the respective magnetic sensors proximate the first and second magnetic tracks, and the plurality of Hall-effect devices proximate the third magnetic track.

Also, during operation of the absolute position magnetic encoder 10, actuation of the Hall-effect devices HE1-HE5 by the track 42 generates discrete windows that can be correlated with the count detection by the sensors 34, 38, thereby allowing the counts output to the logic module 50 to be associated with a general location on the tracks 14, 22 where the detection by the sensors 34, 38 occurred. With reference to FIG. 8, the track 42 is shown in its circular arrangement, with the distal ends of the track 42 shown in FIG. 1 connected to one another. As the track 42 rotates with the target wheel 30, the Hall-effect devices HE1-HE5 are stationary and are sequentially switched or toggled between "on" and "off" states each time one of the devices HE1-HE5 detects a change in magnetic polarity (i.e., a North/South pole junction). Table 2 illustrates all of the combinations of "on" and "off" states that the devices HE1-HE5 can have, with each unique combination being indicative of a window or a "slice" of the target wheel 30 during which the counts detected by the sensors 34, 38 occurred. An entry of "1" corresponds to an "on" state, while an entry of "0" corresponds to an "off" state.

TABLE 2

| Position Numbers | | | | | |
|---|---|---|---|---|---|
| Position # | HE1 | HE2 | HE3 | HE4 | HE5 |
| 1 | 1 | 1 | 1 | 1 | 1 |
| 2 | 0 | 1 | 1 | 1 | 1 |
| 3 | 0 | 0 | 1 | 1 | 1 |
| 4 | 0 | 0 | 0 | 1 | 1 |
| 5 | 0 | 0 | 0 | 0 | 1 |
| 6 | 0 | 0 | 0 | 0 | 0 |
| 7 | 1 | 0 | 0 | 0 | 0 |
| 8 | 1 | 1 | 0 | 0 | 0 |
| 9 | 1 | 1 | 1 | 0 | 0 |
| 10 | 1 | 1 | 1 | 1 | 0 |

The logic module 50, at the same time when the sensors 34, 38, detect their respective count values, records the position number associated with the particular state sequence of the devices HE1-HE5 at that time. As a result, the count values detected by the sensors 34, 38 can be associated with Position 1, Position 2, and so forth on the track 42 which, in turn, can be associated with a select number of pole pairs 18 in the track 14 or pole pairs 26 in the track 22.

In a first mode of operation of the absolute position encoder 10, the track 22 functions as the "measured track" and the track 14 functions as the "reference track." In this mode, the absolute position at any point on the track 22 can be detected, with reference to the track 14, and a decimal output of the absolute position of the track 22, and therefore the target wheel 30 and the moving object having the target wheel 30 mounted thereto, can be provided by the encoder 10. In this mode, the logic module 50 utilizes a stacked array measuring 160 (columns)×25 (rows)×2 (layers) to calculate the absolute position of the track 22 at any particular time.

The stacked array can be pre-populated into the logic module 50 at the time of manufacturing the encoder 10 using calculated or simulated data measured from a master source (e.g., a master encoder 10), or using surrogate data compiled from a sampling of several production encoders 10. This allows the encoder 10 to be manufactured with pre-populated stacked arrays that take into account the tolerances of the process used to manufacture the encoders 10, without requiring the customer or end user to calibrate each encoder 10 separately.

The encoder 10 may also be self-calibrated, or the array self-populated, by rotating the target wheel 30 and track 22 through one full revolution to fill the cells in the array with data from the sensor 34 over the track 14. Specifically, upon commencement of rotation of the tracks 14, 22, the first count detected by the sensor 34 (i.e., the first count of the first pole pair 18 of the track 14) is input into the cell corresponding with the first count of the first pole pair 26 of the track 22. Then, the second count detected by the sensor 34 is input into the cell corresponding with the second count of the first pole pair 26 of the track 22. After the cell corresponding with the $160^{th}$ count of the first pole pair 26 of the track 22 is filled in with a corresponding count from the track 14, the process is repeated for the second, third, fourth, etc. pole pairs 26 of the track 22 until the cell corresponding with the 160th count of the 25th pole pair 26 of the track 22 is filled in.

All of the data input to the array by the sensor 34 is input into the first layer of the array (see Table 3). At the same time as the individual cells in the first layer are being populated with count values from the track 14, the corresponding position numbers recorded by the logic module 50 (described above) are recorded in corresponding cells in the second layer of the array (see Table 4).

After one complete rotation of the target wheel 30, the array is populated with the count values from the track 14 in the first layer and the position numbers associated with those count values from the track 14 in the second layer. The absolute position of the track 22 can then be determined at any time thereafter using the following procedure. First, the sensors 34, 38 simultaneously capture count values from the respective tracks 14, 22, and these values are output to the logic module 50. At the same time, the logic module 50 captures a position number from the track 42 associated with the captured count values from the respective tracks 14, 22.

The logic module 50 then looks to the particular column in the array having the same count value that is detected by the sensor 38, and searches for the cells in the first layer of that column in the array having the same position number in the second layer of the array as the captured position number by the logic module 50. From this group of cells, the logic module 50 compares the captured count value from the track 14 with the values contained in the group of cells, and selects the cell from this group containing a count value that is the same as or substantially similar to the captured count value from the track 14.

The particular row (i.e., the "Nth" row) containing the cell selected by the logic module 50 containing a count value the same as or substantially similar to the captured count value from the track 14 indicates an instantaneous position of the track 22 as somewhere within the Nth pole pair 26 of the track 22. Then, the absolute or instantaneous position of the track 22 can be calculated by multiplying 160 counts/pole pair and (N−1) pole pairs, and adding the captured count value from the track 22. The resulting count value is indicative of the absolute position on the track 22, and therefore the target wheel 30 and the moving object, where the sensors 34, 38 captured the count values from the tracks 14, 22. For example, with reference to Tables 3 and 4 below, the absolute position of the track 22 at an instance when the count captured by the sensor 38 is 20, the count captured by the sensor 34 is 99, and the position number detected by the logic module 50 is 5 is calculated as: (N−1) pole pairs×160 counts/pole pair+20 counts. The resultant value (i.e., the "decimal output") correlates with one of the 4000 total counts that can be detected by the sensor 38 on the track 22.

TABLE 3

First Layer of Array - Track 22 Measured

|  | 1 | 2 | 3 | ... | 20 | ... | 128 | 129 | ... | 160 | Track 22 Count |
|---|---|---|---|---|---|---|---|---|---|---|---|
| 1 | 1 | 2 | 3 | ... | 20 | ... | 128 | 1 | ... | 32 |  |
| 2 | 33 | 34 | 35 | ... | 52 | ... | 32 | 33 | ... | 65 |  |
| 3 | 66 | 67 | 68 | ... | 5 | ... | 65 | 66 | ... | 97 |  |
| ... | ... | ... | ... | ... | ... | ... | ... | ... | ... | ... |  |
| N−1 | ... | ... | ... | ... | ... | ... | ... | ... | ... | ... |  |
| N | ... | ... | ... | ... | 99 | ... | ... | ... | ... | ... |  |
| ... | ... | ... | ... | ... | ... | ... | ... | ... | ... | ... |  |
| 25 Pole Pairs | ... | ... | ... | ... | ... | ... | ... | ... | ... | ... |  |

TABLE 4

Second Layer of Array - Track 22 Measured

|  | 1 | 2 | 3 | ... | 20 | ... | 128 | 129 | ... | 160 | Track 22 Count |
|---|---|---|---|---|---|---|---|---|---|---|---|
| 1 | 1 | 1 | 1 | ... | 1 | ... | 1 | 1 | ... | 1 |  |
| 2 | 1 | 1 | 1 | ... | 1 | ... | 1 | 1 | ... | 1 |  |
| 3 | 1 | 1 | 1 | ... | 1 | ... | 2 | 2 | ... | 2 |  |
| ... | ... | ... | ... | ... | ... | ... | ... | ... | ... | ... |  |
| N−1 | ... | ... | ... | ... | ... | ... | ... | ... | ... | ... |  |
| N | ... | ... | ... | ... | 5 | ... | ... | ... | ... | ... |  |
| ... | ... | ... | ... | ... | ... | ... | ... | ... | ... | ... |  |
| 25 Pole Pairs | 10 | 10 | 10 | 10 | 10 | 10 | 10 | 10 | 10 | 10 |  |

In a second mode of operation of the absolute position encoder 10, the track 14 functions as the "measured track" and the track 22 functions as the "reference track." In this mode, the absolute position at any point on the track 14 can be detected, with reference to the track 22, and a binary output of the absolute position of the track 14, and therefore the target wheel 30 and the moving object having the target wheel 30 mounted thereto, can be provided by the encoder 10. In this mode, the logic module 50 utilizes a stacked array measuring 128 (columns)×32 (rows)×2 (layers) to calculate the absolute position of the track 14 at any particular time.

As previously stated, the array can be populated using calculated data, surrogate data, or by rotating the target wheel 30 and track 14 through one full revolution to fill the cells in the array with data from the sensor 38 over the track 22. Specifically, upon commencement of rotation of the tracks 14, 22, the first count detected by the sensor 38 (i.e., the first count of the first pole pair 26 of the track 22) is input into the cell corresponding with the first count of the first pole pair 18 of the track 14. Then, the second count detected by the sensor 38 is input into the cell corresponding with the second count of the first pole pair 18 of the track 14. After the cell corresponding with the 128$^{th}$ count of the first pole pair 18 of the track 14 is filled in with a corresponding count from the track 22, the process is repeated for the second, third, fourth, etc. pole pairs 18 of the track 14 until the cell corresponding with the 128th count of the 32nd pole pair 18 of the track 14 is filled in.

All of the data input to the array by the sensor 38 is input into the first layer of the array (see Table 5). At the same time as the individual cells in the first layer are being populated with count values from the track 22, the corresponding position numbers recorded by the logic module 50 (described above) are recorded in corresponding cells in the second layer of the array (see Table 6).

After one complete rotation of the target wheel 30, the array is populated with the count values from the track 22 in the first layer and the position numbers associated with those count values from the track 22 in the second layer. The absolute position of the track 14 can then be determined at any time thereafter using the following procedure. First, the sensors 34, 38 simultaneously capture count values from the respective tracks 14, 22, and these values are output to the logic module 50. At the same time, the logic module 50 captures a position number from the track 42 associated with the captured count values from the respective tracks 14, 22. The logic module 50 then looks to the particular column in the array having the same count value that is detected by the sensor 34, and searches for the cells in the first layer of that column in the array having the same position number in the second layer of the array as the captured position number by the logic module 50. From this group of cells, the logic module 50 compares the captured count value from the track 22 with the values contained in the group of cells, and selects the cell from this group containing a count value that is the same as or substantially similar to the captured count value from the track 22.

The particular row (i.e., the "Nth" row) containing the cell selected by the logic module 50 containing a count value the same as or substantially similar to the captured count value from the track 22 indicates an instantaneous position of the track 14 as somewhere within the Nth pole pair 18 of the track 14. Then, the absolute or instantaneous position of the track 14 can be calculated by multiplying 128 counts/pole pair and (N−1) pole pairs, and adding the captured count value from the track 14. The resulting count value is indicative of the absolute position on the track 14, and therefore the target wheel 30 and the moving object, where the sensors 34, 38 captured the count values from the tracks 14, 22. For example, with reference to the Tables 5 and 6 below, the absolute position of the track 14 at an instance when the count captured by the sensor 34 is 31, the count captured by the sensor 38 is 77, and the position number detected by the logic module 50 is 5 is calculated as: (N−1) pole pairs×128 counts/pole pair+ 31 counts. The resultant value (i.e., the "binary output") correlates with one of the 4096 total counts that can be detected by the sensor 34 on the track 14.

TABLE 5

First Layer of Array - Track 14 Measured

|  | 1 | 2 | 3 | ... | 31 | 32 | 33 | ... | ... | 128 | Track 14 Count |
|---|---|---|---|---|---|---|---|---|---|---|---|
| 1 | 1 | 2 | 3 | ... | 31 | 32 | 33 | ... | ... | 128 | |
| 2 | 129 | 130 | 131 | ... | 159 | 160 | 1 | ... | ... | 96 | |
| 3 | 97 | 98 | 99 | ... | 127 | 128 | 129 | ... | ... | 64 | |
| ... | ... | ... | ... | ... | ... | ... | ... | ... | ... | ... | |
| N−1 | ... | ... | ... | ... | ... | ... | ... | ... | ... | ... | |
| N | ... | ... | ... | ... | 77 | ... | ... | ... | ... | ... | |
| ... | ... | ... | ... | ... | ... | ... | ... | ... | ... | ... | |
| 32 Pole Pairs | ... | ... | ... | ... | ... | ... | ... | ... | ... | ... | |

TABLE 6

Second Layer of Array - Track 14 Measured

|  | 1 | 2 | 3 | ... | 31 | 32 | 33 | ... | ... | 128 | Track 14 Count |
|---|---|---|---|---|---|---|---|---|---|---|---|
| 1 | 1 | 1 | 1 | ... | 1 | ... | 1 | 1 | ... | 1 | |
| 2 | 1 | 1 | 1 | ... | 1 | ... | 1 | 1 | ... | 1 | |
| 3 | 1 | 1 | 1 | ... | 1 | ... | 2 | 2 | ... | 2 | |
| ... | ... | ... | ... | ... | ... | ... | ... | ... | ... | ... | |
| N−1 | ... | ... | ... | ... | ... | ... | ... | ... | ... | ... | |
| N | ... | ... | ... | ... | 5 | ... | ... | ... | ... | ... | |
| ... | ... | ... | ... | ... | ... | ... | ... | ... | ... | ... | |
| 32 Pole Pairs | 10 | 10 | 10 | 10 | 10 | ... | 10 | 10 | 10 | 10 | |

In a third mode of operation of the absolute position encoder 10, each of the tracks 14, 22 concurrently functions as the "measured track" and the "reference track" to allow each of the sensors 34, 38 to concurrently provide the decimal output and the binary output of the absolute position of the encoder 10. In other words, the third mode of operation of the encoder 10 combines the first and second modes of operation discussed above, such that twice the number of calculations are made to describe the absolute position of the encoder 10 using binary output and decimal output.

Additional features of the invention include: updates to track position every 10 μs based on the data rate from the sensors 34, 38; SSI and SPI outputs of position; pulse width modulation of position output; user-programmable output voltage of position, current level of position or pulse width modulation of the position; programmable commutation signals accurate to better than 0.1 degrees for 2 to 100 pole motor configurations; quadrature output at any binary or decimal resolution; and field configurable sensors 34, 38 with dip switches or by programming interface.

Pulse width modulation of position output may include the transmission of position information over a range of pulse widths (e.g., between about a 10% duty cycle and about a 90% duty cycle). Additional information, such as diagnostic information, alarm information, and digital date information, may be transmitted by producing pulse widths outside of the normal position range of about 10% duty cycle to about 90% duty cycle. This additional information could be transmitted only when a particular condition occurs, on a regular basis, or upon external demand.

Because the encoder 10 is capable of producing a natural binary output, a decimal output, or both, the encoder 10 can produce a wide array of signals based upon a binary angle position, a decimal angle position, or both. Such signals may include traditional U, V, W commutation signals, reference pulses, or any desired combination of digital outputs based upon binary or decimal angle readings from the encoder 10. These signals can be the result of calculations in the encoder 10 derived from the binary or decimal readings, or the signals could be from a lookup table that contains the logic to turn on or off individual output lines based upon the angle reading by the encoder 10. This technique can be useful in producing commutation signals for a wide range of motors from 2 pole to 100+ pole motors, as well as quadrature or binary output with substantially any configuration of resolution. This technique also allows for a complete user-configurable progression of pulse-width modulation, analog voltage or current, or binary or decimal output over a revolution of the tracks 14, 22 of the encoder 10.

Various features of the invention are set forth in the following claims.

What is claimed is:

1. An absolute position magnetic encoder comprising:
   a first magnetic track configured for a binary output;
   a second magnetic track configured for a decimal output;
   a first magnetic sensor positioned proximate the first magnetic track to detect the magnetic field of the first magnetic track;
   a second magnetic sensor positioned proximate the second magnetic track to detect the magnetic field of the second magnetic track;
   a third magnetic track including a single North/South pole pair; and
   a plurality of Hall-effect devices positioned proximate the third magnetic track to detect the magnetic field of the third magnetic track;
   wherein the encoder is selectively operable to provide one of the binary output and the decimal output.

2. The absolute position magnetic encoder of claim 1, wherein the single pole pair includes a North pole and a South pole, and wherein the Hall-effect devices fit within the circumferential length of one of the North pole and the South pole.

3. The absolute position magnetic encoder of claim 2, wherein the Hall-effect devices fit within the circumferential length of the North pole and the circumferential length of the South pole.

4. The absolute position magnetic encoder of claim 1, further comprising a target wheel supporting the first, second, and third magnetic tracks.

5. The absolute position magnetic encoder of claim 1, further comprising a logic module in communication with the first and second magnetic sensors and the plurality of Hall-effect devices.

6. The absolute position magnetic encoder of claim 5, wherein the logic module is configured to record the output of one of the first and second magnetic sensors into a first array layer, and wherein the logic module is configured to record the output of the plurality of Hall-effect devices into a second array layer having the same number of rows and columns as the first array layer.

7. The absolute position magnetic encoder of claim 1, wherein the first magnetic track includes a first number of North/South pole pairs conducive to provide the binary output, and wherein the second magnetic track includes a second number of North/South pole pairs conducive to provide the decimal output.

8. The absolute position magnetic encoder of claim 7, wherein the first number of North/South pole pairs includes one of 32 North/South pole pairs and a whole number multiple thereof, and wherein the second number of North/South pole pairs includes one of 25 North/South pole pairs and a whole number multiple thereof.

9. The absolute position magnetic encoder of claim 1, wherein at least one of the first and second magnetic sensors includes a microchip having a Hall string multiplying sensor.

10. A method of calculating an absolute position of an encoder, the method comprising:
    providing a first magnetic track configured for a binary output;
    providing a second magnetic track configured for a decimal output;
    detecting a first count value from the first magnetic track;
    detecting a second count value from the second magnetic track substantially simultaneously with the first count value;
    calculating a third count value indicative of the absolute position of the encoder using the first and second count values, the third count value conducive to provide one of the binary output and the decimal output;
    providing a third magnetic track including a single North/South pole pair; and
    detecting a change in magnetic polarity between a North pole and a South pole of the single pole pair.

11. The method of claim 10, further comprising positioning a plurality of Hall-effect devices proximate the third magnetic track, wherein detecting a change in magnetic polarity between the North pole and the South pole of the single pole pair includes detecting a junction between the North pole and the South pole with each of the Hall-effect devices.

12. The method of claim 11, further comprising:
    creating an array having a number of rows equal to a number of pole pairs in one of the first and second magnetic tracks, and a number of columns equal to a resolution of a magnetic sensor positioned proximate the one of the first and second magnetic tracks; and recording the count value detected from the other of the first and second magnetic tracks into the array.

13. The method of claim 12, wherein creating the array includes creating a first array layer into which the count value detected from the other of the first and second magnetic tracks is recorded, and wherein creating the array includes creating a second array layer into which the output of the Hall-effect devices is recorded.

14. The method of claim 13, wherein creating the second array layer includes associating a sequence of on/off states of the Hall-effect devices with a position number; and recording the position number in the second array layer.

15. The method of claim 13, wherein creating the first and second array layers includes creating the second array layer with an equal number of rows and an equal number of columns as the first array layer.

16. The method of claim 10, further comprising:

coupling the first magnetic track, in a circular arrangement, to a target wheel; and coupling the second magnetic track, in a circular arrangement and concentric with the first magnetic track, to the target wheel.

17. The method of claim 10, wherein providing the first magnetic track includes providing a first number of North/South pole pairs conducive to provide the binary output, and wherein providing the second magnetic track includes providing a second number of North/South pole pairs conducive to provide the decimal output.

18. The method of claim 17, wherein providing the first number of North/South pole pairs includes providing one of 32 North/South pole pairs and a whole number multiple thereof, and wherein providing the second number of North/South pole pairs includes providing one of 25 North/South pole pairs and a whole number multiple thereof.

19. The method of claim 10, further comprising providing the binary output and the decimal output of the absolute position of the encoder substantially concurrently.

20. The method of claim 10, further comprising pulse-width modulating the one of the binary output and the decimal output of the absolute position of the encoder over a range of pulse widths between about 10% duty cycle and about 90% duty cycle, wherein pulse-width modulating the one of the binary output and the decimal output of the absolute position of the encoder outside the range of pulse widths between about 10% duty cycle and about 90% duty cycle provides at least one of diagnostic information, alarm information, and digital date information.

21. The method of claim 10, further comprising providing at least one of a U, V, W commutation signal and a reference pulse based upon the one of the binary output and the decimal output of the absolute position of the encoder.

22. An absolute position magnetic encoder comprising:

a first magnetic track including a first number of North/South pole pairs conducive to provide a binary output;

a second magnetic track including a second number of North/South pole pairs conducive to provide a decimal output;

a first magnetic sensor positioned proximate the first magnetic track to detect the magnetic field of the first magnetic track;

a second magnetic sensor positioned proximate the second magnetic track to detect the magnetic field of the second magnetic track;

wherein the encoder is selectively operable to provide one of the binary output and the decimal output.

23. The absolute position magnetic encoder of claim 22, further comprising:

a third magnetic track including a single North/South pole pair; and a plurality of Hall-effect devices positioned proximate the third magnetic track to detect the magnetic field of the third magnetic track.

24. The absolute position magnetic encoder of claim 23, wherein the single pole pair includes a North pole and a South pole, and wherein the Hall-effect devices fit within the circumferential length of one of the North pole and the South pole.

25. The absolute position magnetic encoder of claim 24, wherein the Hall-effect devices fit within the circumferential length of the North pole and the circumferential length of the South pole.

26. The absolute position magnetic encoder of claim 23, further comprising a target wheel supporting the first, second, and third magnetic tracks.

27. The absolute position magnetic encoder of claim 23, further comprising a logic module in communication with the first and second magnetic sensors and the plurality of Hall-effect devices.

28. The absolute position magnetic encoder of claim 27, wherein the logic module is configured to record the output of one of the first and second magnetic sensors into a first array layer, and wherein the logic module is configured to record the output of the plurality of Hall-effect devices into a second array layer having the same number of rows and columns as the first array layer.

29. The absolute position magnetic encoder of claim 22, wherein the first number of North/South pole pairs includes one of 32 North/South pole pairs and a whole number multiple thereof, and wherein the second number of North/South pole pairs includes one of 25 North/South pole pairs and a whole number multiple thereof.

30. The absolute position magnetic encoder of claim 22, wherein at least one of the first and second magnetic sensors includes a microchip having a Hall string multiplying sensor.

31. A method of calculating an absolute position of an encoder, the method comprising:

providing a first magnetic track including a first number of North/South pole pairs conducive to provide a binary output;

providing a second magnetic track including a second number of North/South pole pairs conducive to provide a decimal output;

detecting a first count value from the first magnetic track;

detecting a second count value from the second magnetic track substantially simultaneously with the first count value; and calculating a third count value indicative of the absolute position of the encoder using the first and second count values, the third count value conducive to provide one of the binary output and the decimal output.

32. The method of claim 31, further comprising:

providing a third magnetic track including a single North/South pole pair; and detecting a change in magnetic polarity between a North pole and a South pole of the single pole pair.

33. The method of claim 32, further comprising positioning a plurality of Hall-effect devices proximate the third magnetic track, wherein detecting a change in magnetic polarity between the North pole and the South pole of the single pole pair includes detecting a junction between the North pole and the South pole with each of the Hall-effect devices.

34. The method of claim 33, further comprising:
creating an array having a number of rows equal to a number of pole pairs in one of the first and second magnetic tracks, and a number of columns equal to a resolution of a magnetic sensor positioned proximate the one of the first and second magnetic tracks; and
recording the count value detected from the other of the first and second magnetic tracks into the array.

35. The method of claim 34, wherein creating the array includes creating a first array layer into which the count value detected from the other of the first and second magnetic tracks is recorded, and wherein creating the array includes creating a second array layer into which the output of the Hall-effect devices is recorded.

36. The method of claim 35, wherein creating the second array layer includes
associating a sequence of on/off states of the Hall-effect devices with a position number; and
recording the position number in the second array layer.

37. The method of claim 35, wherein creating the first and second array layers includes creating the second array layer with an equal number of rows and an equal number of columns as the first array layer.

38. The method of claim 31, further comprising:
coupling the first magnetic track, in a circular arrangement, to a target wheel; and
coupling the second magnetic track, in a circular arrangement and concentric with the first magnetic track, to the target wheel.

39. The method of claim 31, wherein providing the first number of North/South pole pairs includes providing one of 32 North/South pole pairs and a whole number multiple thereof, and wherein providing the second number of North/South pole pairs includes providing one of 25 North/South pole pairs and a whole number multiple thereof.

40. The method of claim 31, further comprising providing the binary output and the decimal output of the absolute position of the encoder substantially concurrently.

41. The method of claim 31, further comprising pulse-width modulating the one of the binary output and the decimal output of the absolute position of the encoder over a range of pulse widths between about 10% duty cycle and about 90% duty cycle, wherein pulse-width modulating the one of the binary output and the decimal output of the absolute position of the encoder outside the range of pulse widths between about 10% duty cycle and about 90% duty cycle provides at least one of diagnostic information, alarm information, and digital date information.

42. The method of claim 31, further comprising providing at least one of a U, V, W commutation signal and a reference pulse based upon the one of the binary output and the decimal output of the absolute position of the encoder.

* * * * *